2,837,063

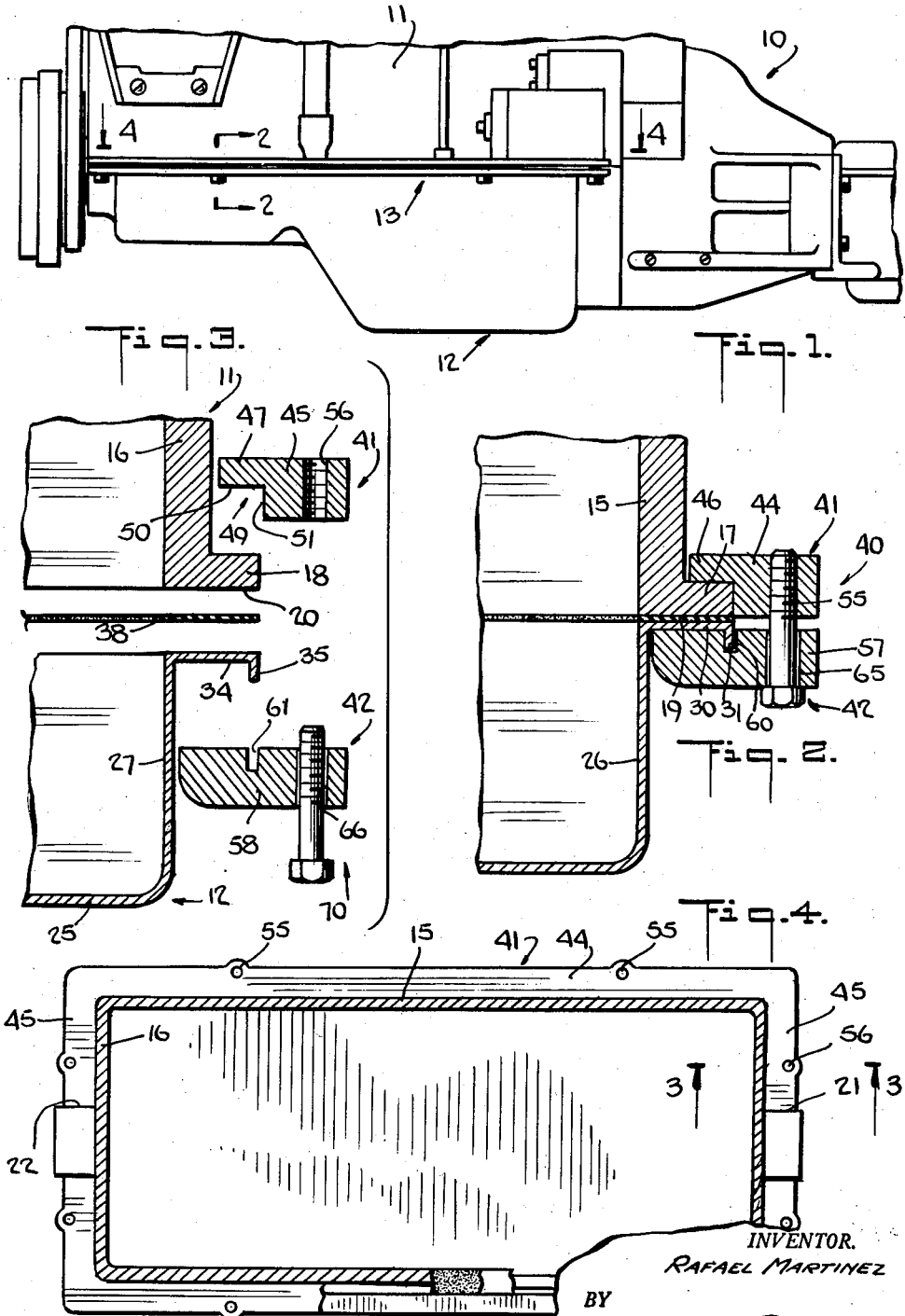
June 3, 1958
R. MARTINEZ
2,837,063
DEVICE FOR CLAMPING A CRANK CASE OIL PAN
TO THE BASE OF A GASOLINE ENGINE
Filed Oct. 31, 1955
INVENTOR.
RAFAEL MARTINEZ
BY
ATTORNEY

United States Patent Office 2,837,063
Patented June 3, 1958

DEVICE FOR CLAMPING A CRANK CASE OIL PAN TO THE BASE OF A GASOLINE ENGINE

Rafael Martinez, New York, N. Y.

Application October 31, 1955, Serial No. 543,656

7 Claims. (Cl. 121—194)

This invention relates to a device for clamping a crank case oil pan to the base of a gasoline engine.

The base of an automobile gasoline engine is usually provided with a flange at the sides and ends, and the crank case oil pan is usually formed with a similar flange. The oil pan has heretofore been fixed to the motor base by a series of screws passing through openings in the flange in the pan and screwed to threaded openings in the flange of the motor base. Such screws pass through openings in a gasket. Such connection hence necessitated making a considerable number of openings in both the base of the motor and in the flange of the oil pan, thereby weakening both and involving considerable labor.

It is therefore an object of the present invention to eliminate the openings from the oil pan and from the base and to provide separate top and bottom pairs of mating clamped members engaging both the flanges on the motor base and on the oil pan with only a few screws to fix the clamping members together for pressing the oil pan tightly against the underside of the motor.

Furthermore, the oil pans have heretofore been made with a downwardly extending lip at the outer edge of the top horizontal flange and in accordance with the present invention the bottom clamps are formed with grooves or channels to receive these lips for accurate positioning of the clamps relative to the motor and oil pan.

Yet another object of the present invention is to provide sets of clamps on opposite sides of the oil pan, each set comprising a top and bottom clamp, with the bottom clamps projecting inwardly beyond the upper clamps to insure a tight leak-proof connection between the oil pan and the motor base.

Yet another object of the present invention is to provide a strong, rugged and durable construction of the character described, which shall be relatively inexpensive to manufacture, which shall be easy to clamp and unclamp, and which shall be practical and efficient to a high degree in use.

Other objects of this invention will in part be obvious and in part hereinafter pointed out.

The invention accordingly consists in the features of construction, combinations of elements, and arrangements of parts, which will be exemplified in the construction hereinafter described, and of which the scope of invention will be indicated in the appended claims.

In the accompanying drawings in which is shown various illustrative embodiments of this invention, Fig. 1 is a side elevational view of a motor embodying the invention;

Fig. 2 is an enlarged cross-sectional view taken on the line 2—2 of Fig. 1;

Fig. 3 is an exploded sectional view taken on the line 3—3 of Fig. 1; and

Fig. 4 is a cross-sectional view taken on the line 4—4 of Fig. 1.

Referring now in detail to the drawing, 10 designates an automobile motor comprising a motor block 11 and a crank case oil pan 12, and clamping means 13 embodying the invention for clamping the motor block to the oil pan.

The motor block 11 has outer side walls 15 and end walls 16 formed with outwardly extending flanges 17 and 18, respectively. The flanges 17 have lower surfaces 19, whereas the flanges 18 have lower surfaces 20. The surfaces 19 and 20 are in the same plane. At the front and rear ends, the motor is formed with the usual semi-circular flanges 21 and 22 for passage of the crank. The oil pan 12 has a bottom wall 25, side walls 26 and end walls 27. The end walls 27 likewise have semi-circular flanges meshing with the semi-circular flanges 20, 21 of the motor to form therewith passages for the crank of the engine.

At the upper ends of the side walls 26 are outwardly extending horizontal flanges 34 formed with downwardly extending lips 35. The flanges 30 and 34 are in the same plane and of the same width as the end surfaces 19 and 20 of the flanges 17 and 18. Between the surfaces 19 and 20 and the flanges 30, 34 are gaskets 38.

Heretofore, the oil pans have been attached to the motor block by tapping a series of closely spaced openings in the flanges 17 and 18 and forming openings in the flanges 30, 34 and passing screws upwardly through the openings in said flanges for threaded engagement within the openings in the flanges 17 and 18. The provision of these openings were found to weaken the motor base flanges and also necessitated considerable work for either attaching the oil pan to the motor, or for removing the oil pan from the motor.

In accordance with the present invention the clamping means 13 comprises a clamp set 40 on each side of the motor. The clamp sets 40 are similar and symmetrically disposed with respect to one another, and only one set will therefore be described.

Each clamp set comprises an upper or top clamp member 41 and a lower or bottom clamp member 42. Each clamp member 41 has an elongated intermediate portion 44 and end portions 45 extending at right angles thereto. Portion 44 is formed with an inwardly extending flange 46 and each of portions 45 is formed with an inwardly extending flange 47. The flanges 46, 47 are formed with undergrooves 49 having a top horizontal undersurface 50 and a vertical surface 51. The surfaces 50 contact the upper surfaces of the flanges 17 and 18, whereas the surfaces 51 contact the outer edges of the flanges 17 and 18. Portion 44 is formed with a pair of spaced top vertical through-openings 55, and each of portions 45 is formed with a single vertical tap through hole 56.

Each of the lower clamping members 52 comprises an elongated intermediate portion 57, and portions 58 extending at right angles thereto. The clamping members 41 and 42 are substantially superimposed. The lower clamping member 42 is formed in the portion 57 thereof with a longitudinal groove 60, whereas the portion 58 is formed with grooves 61. The grooves 61 communicate with the grooves 60. Said grooves 60, 61 receive the lips 31, 35 of the pan 12.

Portion 57 of lower clamping member 42 is formed with a pair of vertical through-openings 65 registering with the top openings 55. The portions 58 of member 42 are formed with vertical smooth openings 66 registering with the openings 56.

To clamp the pan to the motor the gaskets 38 are inserted in place and the clamping members of each set are screwed together by screws 70 passing upwardly through the openings 65 and 66, and screwed into the tapped openings 55, 56.

It will be noted that the clamping members 42 have portions at the inside of the grooves 60, 61 which are received between the lips 31, 35 and the walls 26, 27 and contact the undersides of the flanges 30, 34 thereby causing a strong clamping action to provide a leak-proof joint between the pan and the motor.

It will be noted that neither the base nor the oil pan are formed with openings and hence they are not weakened.

Furthermore, it will be noted that only four screws are required on each side of the motor instead of a great number of screws as in prior constructions.

Heretofore, about twenty or more bolts or screws passing through openings were necessary to attach the oil pan to the motor. With the present construction only eight such holes are required.

It will also be noted that the gasket 38 has no holes in it, whereas heretofore the gaskets had to be formed with holes.

With the present construction a better leak-proof clamping construction may be made. The clamp will always fit the motor and pan because of the engagement of the top clamps with the flange on the top and end surfaces of the base flange of the motor and the engagement of the bottom clamps with the lips and top flanges of the oil pan.

By holding the oil pan in place by hand you can slip the pan clamps into working position and bring them to fit the downwardly extended lips and the oil pan into the corresponding channels or grooves on the lower jaw of both clamps. The oil pan may then be slowly fitted into place and the upper jaw will come to rest on the outer edge of the bottom of the body of the motor, and will hold it in place until ready to start slowly and evenly closing up on the bolts or screws 70, thereby making the whole operation very practical, easy, quick and safe.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent of the United States:

1. In combination, an engine motor having an outwardly extending flange at its lower end, an oil pan having an outwardly extending flange at its upper end disposed beneath the flange of the motor base, a pair of removable clamp jaws on each side of the motor and pan, each pair of clamp jaws comprising an upper clamp jaw engaging the upper side of the flange of the motor, and a lower clamp jaw engaging the underside of the flange on the pan, and means to attach each set of clamp jaws to each other for clamping the pan to the motor, said means comprising fastening members passing through openings in the clamp jaws of each pair, the flange on the oil pan being formed with downwardly extending lips at opposite sides thereof, said lower clamping jaws being formed with grooves receiving said lips.

2. In combination, an engine motor having an outwardly extending flange at its lower end, an upper removable clamping jaw having a portion contacting the top of said flange and a portion contacting the outer edge of said flange, an oil pan having a body formed at its upper end with an outwardly extending flange disposed beneath the flange at the lower end of the motor, said flange on said oil pan being formed at its outer end with a downwardly extending lip, a removable lower jaw having a portion received between the body of the oil pan and the lip and beneath the flange of said oil pan, said lower jaw being formed at its upper surface with a groove receiving said lip, and said upper and lower jaws having portions extending beyond the flanges on said motor and pan, and means for attaching said last mentioned portions together.

3. The combination of claim 2, said attaching means comprising tapped openings in the upper clamp jaw, and screws passing through openings in the lower clamp jaw and screwed to the tapped openings in the upper clamp jaw.

4. In combination, an engine motor and an oil pan, said motor and pan having superimposed flanges comprising side portions and end portions extending inwardly from the ends of the side portions and terminating short of each other, a pair of separate removable clamp jaws on each side of the motor and pan, each pair of clamp jaws having intermediate portions and end portions extending from the ends of said intermediate portions, the upper clamp jaws having portions engaging the tops of the flanges of the motor base, the lower clamp jaws having portions contacting the undersides of the flanges on the oil pan, and means disposed beyond said flanges for clamping the jaws of each pair together whereby to clamp the oil pan to the motor, said lower clamp jaws being formed with grooves and the flange on the oil pan having lips projecting into said grooves.

5. The combination of claim 4, and gaskets interposed between the undersides of the flanges on the motor of the upper sides of the flanges on the oil pan.

6. The combination of claim 5, the attaching means for each pair of clamp jaws comprising screws passing through registering openings in the clamp jaws.

7. The combination of claim 4, the attaching means for each pair of clamp jaws comprising screws passing through registering openings in the clamp jaws.

References Cited in the file of this patent

UNITED STATES PATENTS

| | | |
|---|---|---|
| 423,291 | Trapp | Mar. 11, 1890 |
| 1,362,878 | Ladd | Dec. 21, 1920 |
| 1,480,782 | Primeau | Jan. 15, 1924 |
| 1,737,466 | Lynd | Nov. 26, 1929 |
| 2,039,002 | Hutchison | Apr. 28, 1936 |
| 2,475,836 | Hendicksen et al. | July 12, 1949 |
| 2,700,962 | Field | Feb. 1, 1955 |